United States Patent
Li et al.

(10) Patent No.: US 10,831,876 B2
(45) Date of Patent: Nov. 10, 2020

(54) METHODS AND APPARATUSES FOR IDENTITY AUTHENTICATION IN VIRTUAL REALITY

(71) Applicant: Advanced New Technologies Co., Ltd., George Town (KY)

(72) Inventors: Jing Li, Hangzhou (CN); Liang Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/394,446

(22) Filed: Apr. 25, 2019

(65) Prior Publication Data

US 2019/0251244 A1    Aug. 15, 2019

Related U.S. Application Data

(63) Continuation of application No. PCT/CN2017/111623, filed on Nov. 17, 2017.

(30) Foreign Application Priority Data

Nov. 25, 2016    (CN) .......................... 2016 1 1070218

(51) Int. Cl.
*H04L 29/06*    (2006.01)
*G06F 21/36*    (2013.01)
(Continued)

(52) U.S. Cl.
CPC ............... *G06F 21/36* (2013.01); *G06F 3/01* (2013.01); *G06F 3/0482* (2013.01); *H04L 9/32* (2013.01); *H04L 29/06* (2013.01)

(58) Field of Classification Search
CPC .............................. G06F 21/36; G06F 3/0482
See application file for complete search history.

(56) References Cited

U.S. PATENT DOCUMENTS 8,301,897 B2    10/2012 Turner
8,713,703 B2 *    4/2014 Fisk .................... G06F 21/36
                                                        726/2

(Continued)

FOREIGN PATENT DOCUMENTS

CN    103701614    4/2014
CN    104468101    3/2015

(Continued)

OTHER PUBLICATIONS

International Preliminary Report on Patentability in International Application No. PCT/CN2017/111623, dated May 28, 2019, 7 pages, (with English Translation).

(Continued)

*Primary Examiner* — Jahangir Kabir
(74) *Attorney, Agent, or Firm* — Fish & Richardson P.C.

(57) ABSTRACT

An identity authentication procedure of a user is initiated and a plurality of virtual reality articles is displayed. Selection operation information of the user is determined for the plurality of virtual reality articles. Whether the selection operation information matches predefined standard selection operation information is determined. In response to determining that the selection operation information matches the predefined standard selection operation information, whether the identity authentication procedure of the user succeeds is determined.

20 Claims, 7 Drawing Sheets

(51) Int. Cl.
*G06F 3/0482* (2013.01)
*G06F 3/01* (2006.01)
*H04L 9/32* (2006.01)

(56) References Cited

U.S. PATENT DOCUMENTS

| | | | |
|---|---|---|---|
| 9,251,333 B2 | 2/2016 | Chatterton et al. | |
| 10,027,657 B1* | 7/2018 | Vempati | H04L 63/08 |
| 2008/0072056 A1* | 3/2008 | Turner | H04L 9/3271 713/182 |
| 2014/0013408 A1 | 1/2014 | Ryu | |
| 2014/0096196 A1* | 4/2014 | O'Connor | G06F 21/36 726/4 |
| 2014/0189542 A1 | 7/2014 | Shuster et al. | |
| 2015/0067824 A1* | 3/2015 | Chatterton | G06F 3/0486 726/19 |
| 2015/0339468 A1* | 11/2015 | Son, II | G06F 21/31 726/19 |
| 2016/0132673 A1* | 5/2016 | Birk | G06F 21/30 726/19 |
| 2016/0262017 A1 | 9/2016 | Lavee et al. | |
| 2016/0300054 A1 | 10/2016 | Turgeman et al. | |
| 2016/0307038 A1 | 10/2016 | Skogö et al. | |
| 2017/0318019 A1* | 11/2017 | Gordon | G06K 9/00617 |

FOREIGN PATENT DOCUMENTS

| | | |
|---|---|---|
| CN | 105323073 | 2/2016 |
| CN | 105807917 | 7/2016 |
| CN | 105955491 | 9/2016 |
| EP | 2887253 | 6/2015 |
| EP | 3449412 | 3/2019 |
| EP | 3547605 | 10/2019 |
| JP | 2014092940 | 5/2014 |
| JP | 2015118577 | 6/2015 |
| KR | 20090087548 | 8/2009 |
| KR | 20120007300 | 1/2012 |
| KR | 20150134952 | 12/2015 |
| RU | 2589397 | 7/2016 |
| TW | I449953 | 8/2014 |
| WO | WO 2014147858 | 9/2014 |
| WO | WO 2018095282 | 5/2018 |

OTHER PUBLICATIONS

International Search Report and Written Opinion in International Application No. PCT/CN2017/111623, dated Feb. 7, 2019, 11 pages (with English Translation).
Extended European Search Report in European Application No. 17874350.6, dated Oct. 30, 2019, 8 pages.

* cited by examiner

METHODS AND APPARATUSES FOR IDENTITY AUTHENTICATION IN VIRTUAL REALITY

CROSS-REFERENCE TO RELATED APPLICATIONS

This application is a continuation of PCT Application No. PCT/CN2017/111623, filed on Nov. 17, 2017, which claims priority to Chinese Patent Application No. 201611070218.X, filed on Nov. 25, 2016, and each application is hereby incorporated by reference in its entirety.

TECHNICAL FIELD

The present application relates to the field of virtual reality technologies, and in particular, to identify authentication methods and apparatuses.

BACKGROUND

In network environments, users perform network communication and interactions through virtual identities (for example, registered virtual accounts). Therefore, user identity authentication generally needs to be performed in situations such as account login, information modification, and online payment, to improve security.

In related technologies, identity authentication methods usually include SMS verification codes, facial recognition, fingerprint recognition, etc. However, in virtual reality (Virtual Reality, VR) scenarios, it is difficult to directly use the previous identity authentication methods in the related technologies as users need to wear virtual reality devices (for example, virtual reality glasses) and to engage in immersive virtual scenes provided by the virtual reality devices.

Therefore, an identity authentication solution applicable to virtual reality scenarios is urgently needed.

SUMMARY

In view of this, the present application provides an identity authentication method and apparatus so that identity authentication in a virtual reality scene can be implemented and an authentication process can be efficient and convenient.

To achieve the previous objectives, the present application provides the following technical solutions:

According to a first aspect of the present application, an identity authentication method is provided and applied to a virtual reality device. The method includes the following: displaying multiple virtual reality articles when an identity authentication procedure specific to a user is initiated; determining selection operation information of the user for the virtual reality articles; and determining that identity authentication of the user succeeds when the selection operation information matches predefined standard selection operation information.

According to a second aspect of the present application, an identity authentication apparatus is provided and applied to a virtual reality device. The apparatus includes the following: a display unit, configured to display multiple virtual reality articles when an identity authentication procedure specific to a user is initiated; a determining unit, configured to determine selection operation information of the user for the virtual reality articles; and a judgment unit, configured to determine that identity authentication of the user succeeds when the selection operation information matches predefined standard selection operation information.

It can be seen from the previous technical solutions that, in the present application, multiple virtual reality articles are displayed in a virtual reality scene so that an authenticated user can perform a correct selection operation on these virtual reality articles and that selection operation information matches standard selection operation information, to correctly authenticate a user identity. In addition, as processes such as virtual reality article display and selection are integrated into the virtual reality scene, compared with identity authentication methods in a related technology, the present application can better adapt to the virtual reality scene, and an identity authentication process can be efficient and convenient.

DESCRIPTION OF IMPLEMENTATIONS

To further describe the present application, the following implementations are provided.

Figure 1:
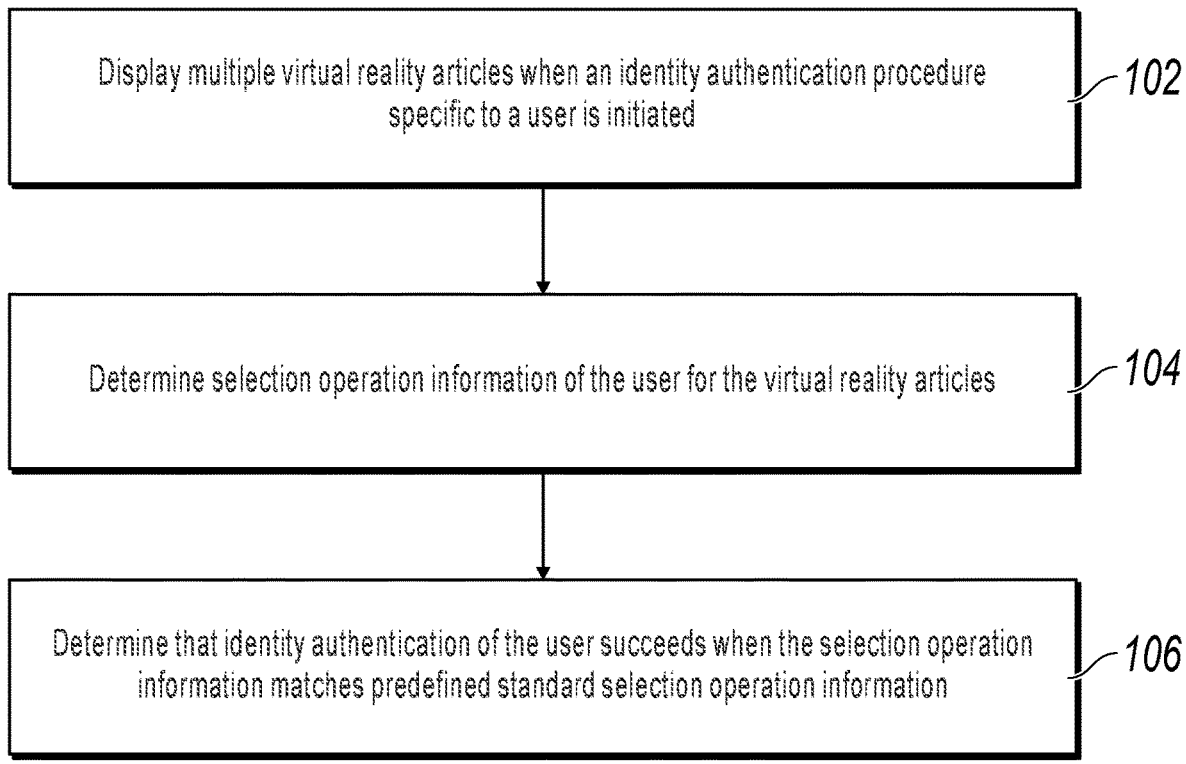
FIG. 1 is a flowchart illustrating an identity authentication method, according to an example implementation of the present application.

FIG. 1 is a flowchart illustrating an identity authentication method, according to an example implementation of the present application. As shown in FIG. 1, the method is applied to a virtual reality device, and can include the following steps.

Step 102: Display multiple virtual reality articles when an identity authentication procedure specific to a user is initiated.

In the present implementation, the identity authentication solution of the present application can be applied to any form of virtual reality device in related technologies. The present application is not limited thereto. For example, the virtual reality device can be an all-in-one device, that is, a data processing module, an image rendering module, an image display module, etc. are integrated. Or, the virtual reality device can be a split-type device. For example, the virtual reality device can be divided into a wearable display structure and an image processing structure. The wearable display structure can be virtual reality glasses, a virtual reality helmet, or another form so that the user watches virtual reality images (equivalent to the previous image display module) by using the wearable display structure. The image processing structure can be an electronic device such as a mobile phone, a tablet, or a PC, used to implement functions such as data processing (equivalent to the previous data processing module) and image rendering (equivalent to the previous image rendering module).

In an implementation, the virtual reality device can display candidate virtual reality articles indicated by standard selection operation information. In other words, the standard selection operation information is equivalent to a "correct answer" for identity authentication, and the virtual reality device can display virtual reality articles in the "correct answer".

Then, in one situation, the virtual reality device can determine virtual reality articles selected by the user. For example, the virtual reality device can display multiple virtual reality articles. Based on conventional thinking, an unauthenticated user certainly considers a method such as selecting some virtual reality articles from the multiple virtual reality articles or sorting (successively selecting) these virtual reality articles in sequence, instead of selecting all of these virtual reality articles. However, in practice, because the virtual reality device displays the candidate virtual reality articles indicated by the standard selection operation information, the user needs to select all of the displayed virtual reality articles, to match the standard selection operation information, thereby implementing identity authentication of the user.

In another situation, the virtual reality device can determine virtual reality articles selected by the user and a selection sequence of the user for these candidate virtual reality articles, and use the selected virtual reality articles and the selection sequence as selection operation information for comparison with the standard selection operation information, thereby implementing identity authentication of the user. In other words, the user can succeed in the identity authentication only when the user selects the displayed virtual reality articles in a correct sequence. Otherwise, it can be considered that the identity authentication fails. During virtual reality article selection, the user can select the same virtual reality article once or multiple times, and the present application sets no limitation thereto.

In another implementation, the virtual reality device can display both candidate virtual reality articles indicated by standard selection operation information and distracting virtual reality articles not indicated by the standard selection operation information. In other words, the virtual reality device displays not only the virtual reality articles in the previous "correct answer" but also several distracting virtual reality articles that serve as distracters.

Then, in one situation, the virtual reality device can determine virtual reality articles selected by the user. For example, the virtual reality device displays both the virtual reality articles in the previous "correct answer" and the distracting virtual reality articles that serve as distracters, and an authenticated user can identify and differentiate between the virtual reality articles (the candidate virtual reality articles and the distracting virtual reality articles). Therefore, after the user selects all of the candidate virtual reality articles, it can be determined that identity authentication of the user succeeds. Similarly, when the user selects all of the distracting virtual reality articles, it can be determined that the identity authentication of the user succeeds. The present thought is the same as the thought used in the previous solution.

In another situation, the virtual reality device can determine virtual reality articles selected by the user and a selection sequence of the user for these candidate virtual reality articles, and use the selected virtual reality articles and the selection sequence as selection operation information for comparison with the standard selection operation information, thereby implementing identity authentication of the user. In other words, the user can succeed in the identity authentication only when the user identifies and differentiates between the virtual reality articles and selects the displayed virtual reality articles in a correct sequence. Otherwise, it can be considered that the identity authentication fails. During virtual reality article selection, the user can select the same virtual reality article once or multiple times, depending on a description of a candidate virtual reality article sequence in the standard selection operation information, and the present application sets no limitation thereto.

Optionally, the distracting virtual reality articles are different from the candidate virtual reality articles in a predetermined dimension, where the predetermined dimension includes at least one of the following. Certainly, the present application sets no limitation thereto.

(1) Article category: Different categories of articles usually have different appearances. For example, the candidate virtual reality articles are a pen, a cup, a lamp, etc., and the distracting virtual reality articles can be a pillow, a television set, a toothbrush, etc. As such, the user can differentiate between different virtual reality articles.

(2) Article specification: Articles of the same category can be differentiated based on article specifications. "Specification" can be understood from multiple aspects: For example, in one situation, "specification" can be understood as a size of an article. For example, a candidate virtual reality article is a cup of a small size, and a distracting virtual reality article can be a cup of a larger size. In another situation, "specification" can be understood as a model of an article. For example, a candidate virtual reality article can be a glass cup, and a distracting virtual reality article can be a plastic cup. As such, even if the two cups have the same volume, the user can still differentiate between the different virtual reality articles. Certainly, "specification" can further be understood from other aspects, and details are omitted here for simplicity and the present application sets no limitation thereto.

(3) Spatial posture: Articles of the same category and specification can be differentiated based on spatial postures of the articles. For example, a candidate virtual reality article can be a cup with its opening facing upward, and a distracting virtual reality article can be a cup with its opening facing downward. For another example, a candidate virtual reality article can be a fountain pen with its nip facing leftward, and a distracting virtual reality article can be a fountain pen with its nip facing forward, etc.

(4) Relative position relationship with another virtual reality article: Articles of the same category and specification can be differentiated based on a relative position relationship between the articles. For example, a candidate virtual reality article can be a cup on a virtual reality desk in a virtual reality scene, and a distracting virtual reality article can be a cup on a virtual reality tea table in a virtual reality scene. For another example, a candidate virtual reality article can be a fountain pen in an upper left corner on a desktop of a virtual reality desk in a virtual reality scene, and a distracting virtual reality article can be a fountain pen in an upper right corner on a desktop of or in a drawer of a virtual reality desk in a virtual reality scene, etc.

In an implementation, the virtual reality device can provide the user with scene options corresponding to multiple predefined virtual reality scenes, display a virtual reality scene corresponding to a scene option selected by the user, and in the displayed virtual reality scene, display virtual reality articles pre-associated with the displayed virtual reality scene. When selection operation information matches standard selection operation information pre-associated with the displayed virtual reality scene, it can be determined that identity authentication of the user succeeds. In other words, multiple answers (namely, multiple pieces of standard selection operation information) can be predetermined. These answers respectively correspond to the multiple virtual reality scenes, and the user needs to generate selection operation information corresponding to a selected virtual reality scene based on the virtual reality scene. As such, an authenticated user can switch between these virtual reality scenes, to reduce an answer leak caused by using the same virtual reality scene and answer, thereby helping improve security.

In an implementation, the virtual reality device can provide the user with scene options corresponding to multiple predefined virtual reality scenes, display a virtual reality scene corresponding to a scene option selected by the user, and display the virtual reality articles in the displayed virtual reality scene. When the displayed virtual reality scene is a predefined standard scene, and selection operation information matches predefined standard selection operation information, it can be determined that identity authentication of the user succeeds. In other words, the user can succeed in the identity authentication only when the user selects a correct virtual reality scene and generates correct selection operation information. Otherwise, the user fails the identity authentication if the user generates correct selection operation information in a wrong virtual reality scene or generates wrong selection operation information in a correct virtual reality scene. The predefined standard scene can be related to an initiation process of the identity authentication procedure. For example, when the initiation process is a login process, the predefined standard scene can be standard scene 1, and when the initiation process is a payment process, the predefined standard scene can be standard scene 2 or standard scene 3. As such, the "predefined standard scene" can vary with the initiation process, thereby further improving information security.

In one situation, the virtual reality device can display the same virtual reality articles in all displayed virtual reality scenes. In other words, the user needs to identify the correct virtual reality scene. In addition, standard selection operation information corresponding to each virtual reality scene can be the same or different (that is, there is standard selection operation information pre-associated with each virtual reality scene). In short, the user can succeed in the identity authentication only when the user generates the correct selection operation information in the correct virtual reality scene.

In another situation, the virtual reality device can display the virtual reality articles pre-associated with the displayed virtual reality scene. Each piece of selection operation information is used for matching with standard selection operation information pre-associated with the predefined standard scene. In other words, multiple answers (namely, multiple pieces of standard selection operation information) can be predetermined. These answers respectively correspond to multiple virtual reality scenes, and the user needs to first select a correct virtual reality scene and then further generate correct selection operation information in the virtual reality scene, thereby further helping improve reliability of the identity authentication.

It is worthwhile to note that, based on some of the previous implementations, there are possibly multiple virtual reality scenes, and there is standard selection operation information (namely, an "answer") pre-associated with each of these virtual reality scenes. However, it does not mean that the standard selection operation information is necessarily the same or different. In practice, the standard selection operation information is mutually independent and may be completely different, partially the same, or exactly the same based on actual situations. The present application sets no limitation thereto.

Step 104: Determine selection operation information of the user for the virtual reality articles.

Step 106: Determine that identity authentication of the user succeeds when the selection operation information matches predefined standard selection operation information.

In an implementation, the virtual reality device can determine virtual reality articles selected by the user, and add the virtual reality articles as the selection operation information. Then, when the virtual reality articles selected by the user are consistent with candidate virtual reality articles indicated by the standard selection operation information, it can be determined that the selection operation information matches the standard selection operation information and it can be determined that the identity authentication of the user succeeds. In other words, when the virtual reality articles selected by the user are virtual reality articles indicated by the standard selection operation information, regardless of which method or sequence that the user uses to select these virtual reality articles, it can be determined that the identity authentication succeeds.

In another implementation, in addition to adding the previous virtual reality articles as the selection operation information, the virtual reality device can further determine a selection sequence of the user for the virtual reality articles, and add the selection sequence as the selection operation information. Then, when the virtual reality articles selected by the user are consistent with the candidate virtual reality articles indicated by the standard selection operation information, and the selection sequence is consistent with a standard sequence of the candidate virtual reality articles indicated by the standard selection operation information, it can be determined that the selection operation information matches the standard selection operation information and it can be determined that the identity authentication of the user succeeds. In other words, only when the user selects displayed virtual reality articles in a correct sequence, and the selected virtual reality articles are the virtual reality articles indicated by the standard selection operation information, it can be determined that the identity authentication of the user succeeds. Such practice helps improve reliability of the identity authentication.

In the present implementation, when the virtual reality device performs matching between the selection operation information and the standard selection operation information, in one situation, if the selection operation information is the same as the standard selection operation information, the virtual reality device determines that the selection operation information matches the standard selection operation information, and determines that the identity authentication of the user succeeds; in another situation, if the selection operation information includes consecutive-selection operation information of the user for several virtual reality articles and the consecutive-selection operation information is the same as the standard selection operation information, the virtual reality device determines that the selection operation information matches the standard selection operation information, and determines that the identity authentication of the user succeeds. In other words, provided that a real-time selection operation includes a "correct answer", any selection operation information can be included in front of or behind the "correct answer". As such, the user can proactively input some irrelevant selection operation information in front of or behind the "correct answer" for distraction, to prevent a leak of the standard selection operation information.

It can be seen from the previous technical solutions that, in the present application, multiple virtual reality articles are displayed in a virtual reality scene so that an authenticated user can perform a correct selection operation on these virtual reality articles and that selection operation information matches standard selection operation information, to correctly authenticate a user identity. In addition, as processes such as virtual reality article display and selection are integrated into the virtual reality scene, compared with identity authentication methods in a related technology, the present application can better adapt to the virtual reality scene, and an identity authentication process can be efficient and convenient.

The following describes the technical solutions of the present application in detail with reference to implementations.

User identity authentication in a virtual reality scene can be divided into a setting phase and an authentication phase from a whole for implementation.

Phase 1: Setting Phase

In the setting phase, each user performs settings based on a "correct answer" that the user expects to use, for example, selects a predefined standard scene or sets associated standard selection operation information for each virtual reality scene.

The virtual reality device can configure itself to a setting mode, and display available virtual reality articles. Then, the user performs a selection operation on the displayed virtual reality articles in the setting mode, and the virtual reality device can record the selection operation and generate corresponding standard selection operation information. Similarly, the virtual reality device can display scene options corresponding to all virtual reality scenes to the user, and use a selected virtual reality scene as a predefined standard scene based on a scene option selection operation of the user.

In practice, the setting operation of the user in the setting phase is mutually associated with an operation in the authentication phase described below. For example, virtual reality scene selection of the user in the setting phase is similar to virtual reality scene selection in the authentication phase, and a generation process of standard selection operation information of the user in the setting phase is similar to generation of selection operation information in the authentication phase. Therefore, reference can be made to the following authentication phase and details are omitted here for simplicity.

Phase 2: Authentication Phase
Implementation 1

Figure 2:
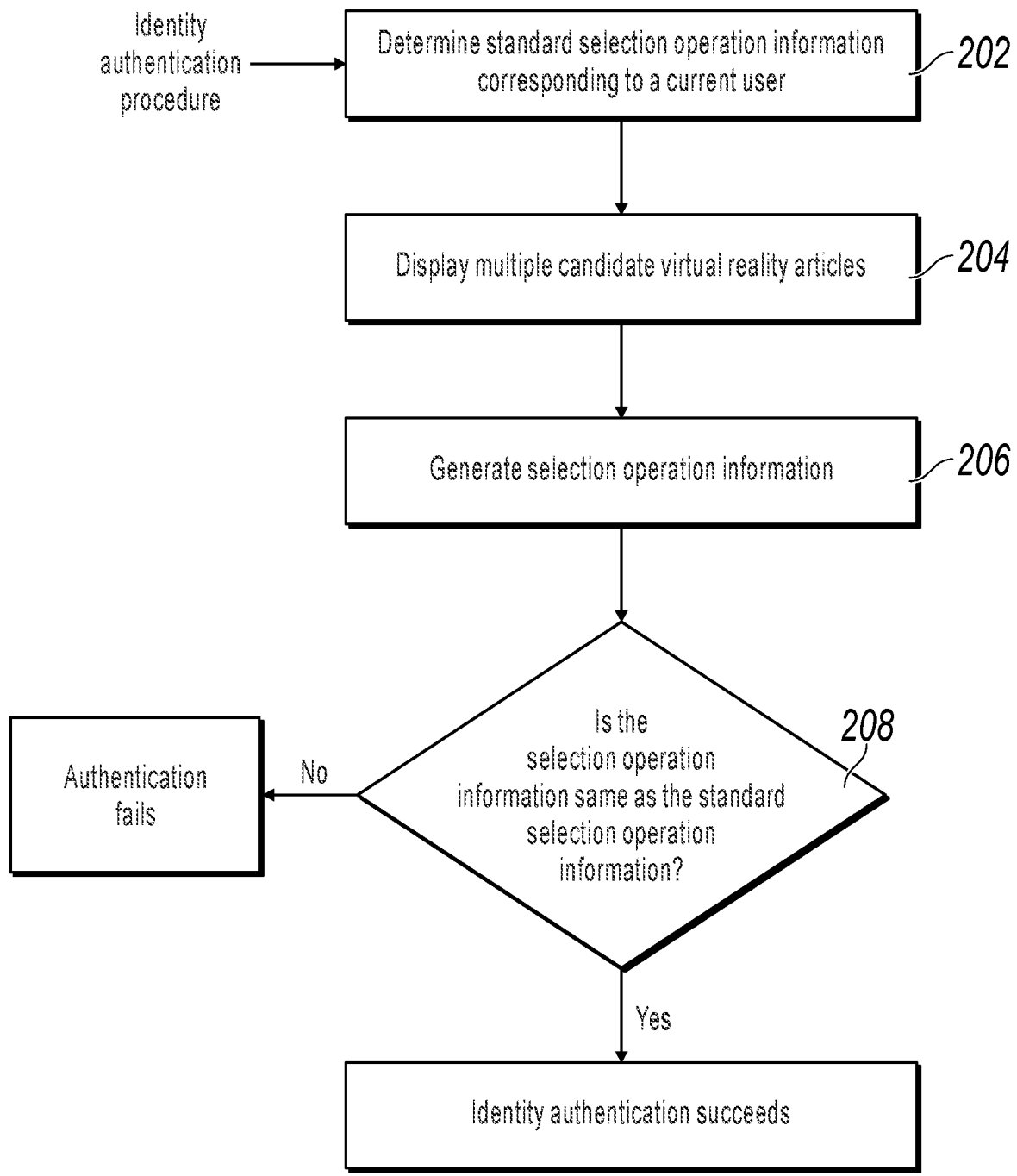
FIG. 2 is a flowchart illustrating an identity authentication method, according to Example Implementation 1 of the present application.

As an example implementation, the virtual reality device can display the candidate virtual reality articles indicated by the standard selection operation information, and the user can complete the identity authentication by selecting all of the candidate virtual reality articles. Correspondingly, FIG. 2 is a flowchart illustrating an identity authentication method, according to Example Implementation 1 of the present application. As shown in FIG. 2, the method is applied to a virtual reality device, and can include the following steps.

Step 202: When an identity authentication procedure is initiated, the virtual reality device determines standard selection operation information corresponding to a current user.

In the present implementation, the identity authentication procedure can be initiated by a predefined function. For example, the function can include a login function, a payment function, an account information query function, a password change function, etc. The present application sets no limitation thereto.

In the present implementation, the identity authentication procedure aims at verifying whether the current user is a certain specific user. Therefore, the virtual reality device can obtain the standard selection operation information pre-associated with the specific user (for example, the specific user pre-configures the standard selection operation information or the standard selection operation information is bound to the specific user in advance), and use the standard selection operation information as a "correct answer" for identity authentication of the current user.

Step 204: The virtual reality device displays multiple candidate virtual reality articles.

In the present implementation, the virtual reality device can determine the candidate virtual reality articles indicated by the standard selection operation information, and display these candidate virtual reality articles. For example, assume that the standard selection operation information is "the user selects virtual reality articles A, B, and C". The virtual reality device can use virtual reality articles A, B, and C as the previous candidate virtual reality articles, and display virtual reality articles A, B, and C to the current user.

Step 206: The virtual reality device generates selection operation information.

In the present implementation, the virtual reality device can generate corresponding selection operation information based on a selection operation performed by the current user on the displayed candidate virtual reality articles. For example, the selection operation information can include virtual reality articles selected by the current user. For example, the virtual reality articles can be represented by ID information of the virtual reality articles, that is, the previous "A", "B", "C", etc. As such, the selection operation information can be "the user selects virtual reality articles A, B, and C."

Step 208: When the selection operation information is the same as the standard selection operation information, the virtual reality device determines that identity authentication of the current user succeeds; or otherwise, the virtual reality device determines that the identity authentication of the current user fails.

In the present implementation, by comparing the selection operation information with the standard selection operation information, it can be determined whether the identity authentication of the current user succeeds. For example, when the virtual reality device displays only the candidate virtual reality articles indicated by the standard selection operation information, that is, the selection operation information includes only candidate virtual reality articles selected by the user, if the selection operation information is the same as the standard selection operation information, it can be determined that the selection operation information matches the standard selection operation information, and it can be determined that the identity authentication of the current user succeeds.

In other words, the current user in the present implementation should perform the following operation on the virtual reality articles displayed by the virtual reality device: selecting all of the displayed virtual reality articles so that the selection operation information and the standard selection operation information both indicate "the user selects virtual reality articles A, B, and C", thereby determining that the identity authentication of the current user succeeds.

It is worthwhile to note that, based on a conventional identity authentication design idea, the user generally needs to select one "correct" option from multiple provided options (equivalent to the multiple virtual reality articles displayed by the virtual reality device), or sort the multiple options, instead of making the user select all of the options. In the present implementation, thinking inertia of the conventional design idea is used, and the user needs to select all of the displayed virtual reality articles, thereby implementing the identity authentication of the current user.

Implementation 2

Figure 3:
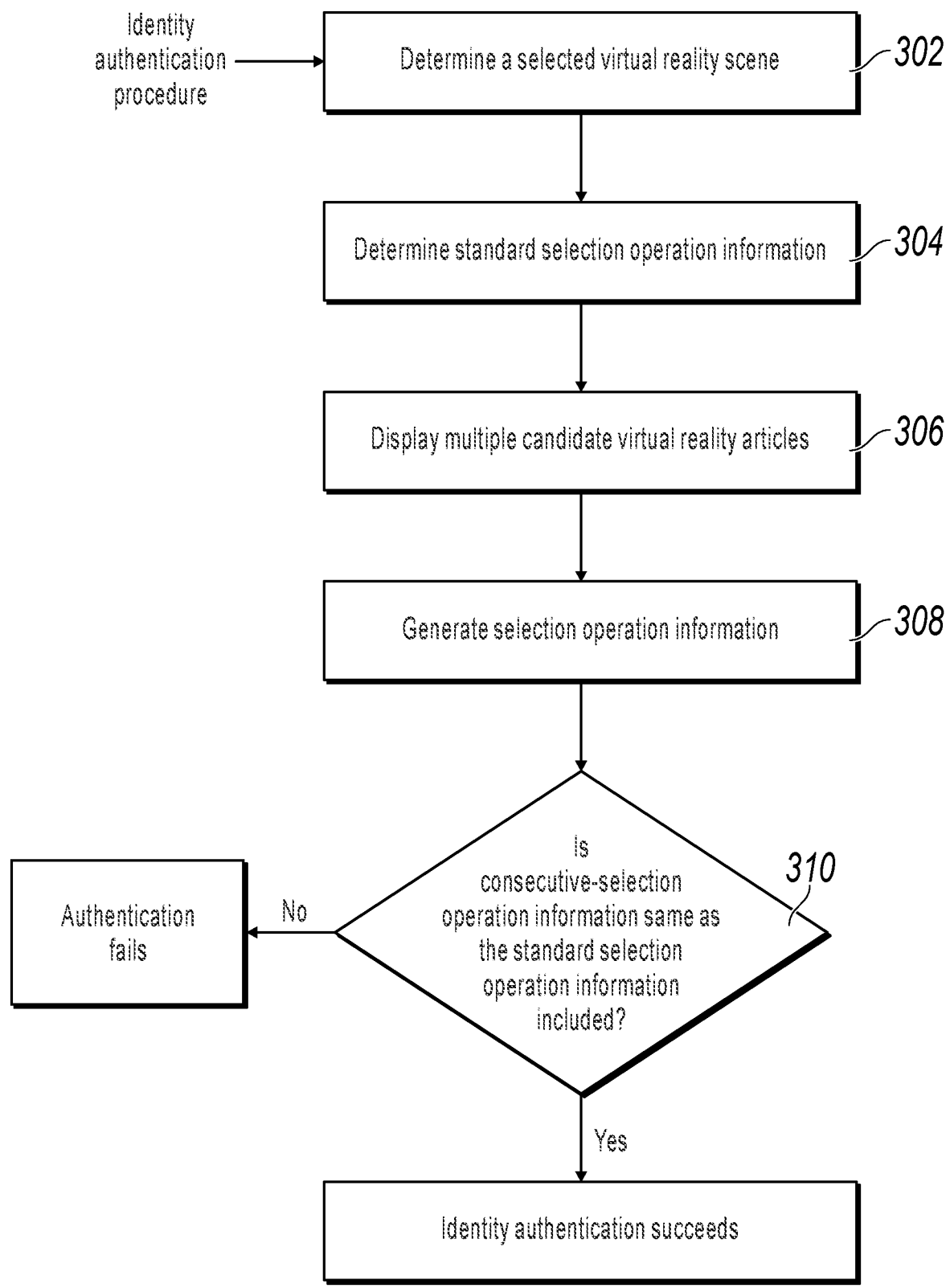
FIG. 3 is a flowchart illustrating an identity authentication method, according to Example Implementation 2 of the present application.

As another example implementation of the present application, the virtual reality device can provide multiple virtual reality scenes and each virtual reality scene corresponds to standard selection operation information so that after selecting any virtual reality scene, the user can complete the identity authentication only when the user generates selection operation information that matches the standard selection operation information corresponding to the any virtual reality scene. Correspondingly, FIG. 3 is a flowchart illustrating an identity authentication method, according to Example Implementation 2 of the present application. As shown in FIG. 3, the method is applied to a virtual reality device, and can include the following steps.

Step 302: When an identity authentication procedure is initiated, the virtual reality device determines a virtual reality scene selected by a current user.

In the present implementation, the virtual reality device can display scene options for all virtual reality scenes to the user, and determine, based on a scene option selection of the current user, a virtual reality scene selected by the current user. Certainly, the current user can further select a virtual reality scene in another method provided by the virtual reality device. The present application sets no limitation thereto.

The virtual reality device can display a corresponding virtual reality image based on the virtual reality scene selected by the current user, to construct the virtual reality scene. For example, when the selected virtual reality scene is a "study room", a virtual reality image related to the "study room" can be displayed, or when the selected virtual reality scene is a "living room", a virtual reality image related to the "living room" can be displayed so that the user obtains better immersive experience.

Step 304: The virtual reality device determines standard selection operation information pre-associated with the selected virtual reality scene.

In the present implementation, there can be standard selection operation information pre-associated with each virtual reality scene. All virtual reality scenes are mutually independent, and corresponding standard selection operation information is mutually independent. In other words, there are multiple "correct answers" in the present implementation. Correspondingly, in an implementation, identity authentication can be completed provided that selection operation information generated by the current user meets any "correct answer". Certainly, in another implementation, the current user needs to generate corresponding selection operation information for at least a predetermined quantity of virtual reality scenes, and only when the selection operation information separately matches standard selection operation information pre-associated with the corresponding virtual reality scenes, it can be determined that the identity authentication of the current user succeeds.

Step 306: The virtual reality device displays multiple candidate virtual reality articles.

In the present implementation, each virtual reality scene corresponds to standard selection operation information. Therefore, the virtual reality device can determine the corresponding standard selection operation information based on the virtual reality scene selected by the current user, and display candidate virtual reality articles indicated by the standard selection operation information.

Step 308: The virtual reality device generates selection operation information.

In the present implementation, the virtual reality device can generate the corresponding selection operation information based on a selection operation performed by the current user on the candidate virtual reality articles. For example, the selection operation information can include (1) virtual reality articles selected by the current user and (2) a selection sequence of the user for the virtual reality articles.

For the "virtual reality articles selected by the user", similar to step 206 in the implementation shown in FIG. 2, for example, the virtual reality articles can be represented by ID information of the virtual reality articles, that is, the previous "A", "B", "C", etc. In such a situation, the selection operation information can be "the user selects virtual reality articles A, B, and C."

For the "selection sequence", for example, of the previous virtual reality articles A, B, and C, assume that the current user successively selects virtual reality articles A, B, and C, a corresponding selection sequence can be A→B→C. Or, assume that the current user successively selects virtual reality articles C, B, and A, a corresponding selection sequence can be C→B→A. When the selection sequence is involved, the current user can select the same virtual reality article multiple times. For example, when the selection sequence is A→C→A→B→A→B, it indicates that the user selects virtual reality article A three times, virtual reality article B twice, and virtual reality article C once.

Step 310: When the selection operation information includes consecutive-selection operation information that is the same as the standard selection operation information, the virtual reality device determines that identity authentication of the current user succeeds; or otherwise, the virtual reality device determines that the authentication of current user fails.

In an implementation, the consecutive-selection operation information can be the selection operation information itself, that is, when the selection operation information is the same as the standard selection operation information, the virtual reality device can determine that the selection operation information matches the standard selection operation information, and determine that the identity authentication of the current user succeeds. For example, when the standard selection operation information is "A→B→C", if the selection operation information is "A→B→C", it is determined that the identity authentication of the current user succeeds. However, if the selection operation information is "B→A→B→C→B", even if the selection operation information includes "A→B→C", it is still determined that the identity authentication fails.

In another implementation, the consecutive-selection operation information can be a part of the selection operation information, and the consecutive-selection operation information itself should be continuous information and cannot be formed by multiple pieces of separated selection operation information. For example, when the standard selection operation information is "A→B→C", if the selection operation information is "B→A→B→C→B", it can be determined that the identity authentication of the current user succeeds because the selection operation information includes the consecutive-selection operation information "A→B→C". If the selection operation information is "A→B→B→C", even though "A→B" and "C" are included, it can be determined that the identity authentication fails because "A→B" and "C" are separated. In the present implementation, the current user can add irrelevant content in front of or behind or in front of and behind the consecutive-selection operation information for distraction, to reduce an information leak caused by peeping from another user during an input process, thereby helping improve information security.

It is worthwhile to note that, the technical features in the implementation shown in FIG. 3 are also applicable to other implementations provided in FIG. 2 or the present application. For example, the technical methods related to the virtual reality scenes in the implementation shown in FIG. 3 are also applicable to other implementations provided in FIG. 2 or the present application. Therefore, the standard selection operation information is not unique or fixed but related to the virtual reality scene selected by the current user, thereby improving information security. For another example, the displayed virtual reality articles are successively selected, to generate the corresponding selection operation information including the "virtual reality articles selected by the user" and the "selection sequence". Such practice is also applicable to other implementations provided in FIG. 2 or the present application, thereby improving information security. For another example, the technical methods used in step 310 can also be used in other implementations provided in FIG. 2 or the present application, that is, the selection operation information can include the consecutive-selection operation information and other irrelevant information, to increase complexity and randomness of the selection operation information, and prevent other users from inferring the standard selection operation information by observing an operation of the user, thereby helping improve information security. Similarly, other technical features in the implementation shown in FIG. 3 can also be applied to other implementations, and details are omitted here for simplicity.

Implementation 3

Figure 4:
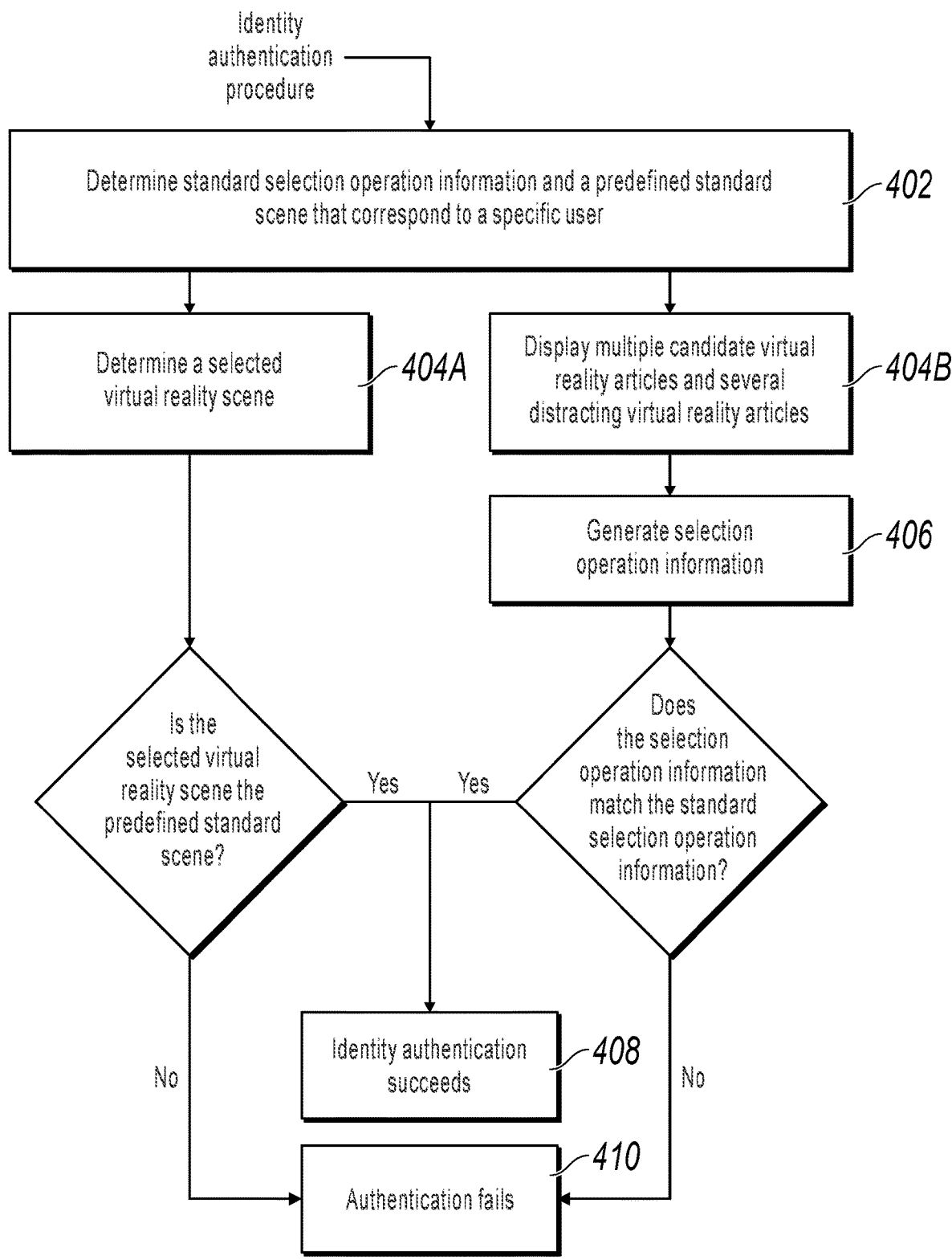
FIG. 4 is a flowchart illustrating an identity authentication method, according to Example Implementation 3 of the present application.

As still another example implementation of the present application, the virtual reality device can provide multiple virtual reality scenes. Although all virtual reality scenes use the same standard selection operation information, the user can complete the identity authentication only after selecting a predefined standard scene and generating selection operation information that matches the standard selection operation information. Correspondingly, FIG. 4 is a flowchart illustrating an identity authentication method, according to Example Implementation 3 of the present application. As shown in FIG. 4, the method is applied to a virtual reality device, and can include the following steps.

Step 402: When an identity authentication procedure is initiated, the virtual reality device can separately determine standard selection operation information corresponding to a specific user and a predefined standard scene corresponding to the current user.

In the present implementation, the identity authentication procedure aims at verifying whether the current user is a certain specific user. Therefore, the virtual reality device can obtain the standard selection operation information and the standard scene that are pre-associated with the specific user, and use the standard selection operation information and the standard scene as a "correct answer" for identity authentication of the current user.

Step 404 A: The virtual reality device determines a selected virtual reality scene.

In the present implementation, similar to step 302 in the implementation shown in FIG. 3, the virtual reality device can determine the virtual reality scene selected by the current user, and details are omitted here for simplicity.

Step 404B: The virtual reality device displays multiple candidate virtual reality articles and several distracting virtual reality articles.

In the present implementation, the multiple virtual reality articles displayed by the virtual reality device can include both candidate virtual reality articles indicated by the standard selection operation information and distracting virtual reality articles not indicated by the standard selection operation information. As such, the distracting virtual reality articles can serve as distracters, to distract and confuse an unauthenticated user, thereby helping improve reliability of the identity authentication.

In the present implementation, the distracting virtual reality articles are different from the candidate virtual reality articles in a predetermined dimension. The following provides a detailed description with reference to various predetermined dimensions.

(1) Article Category

The distracting virtual reality articles displayed by the virtual reality device can belong to different categories from the candidate virtual reality articles. For example, assume that the candidate virtual reality articles are a pen, a cup, a lamp, etc., the distracting virtual reality articles can be a pillow, a television set, a toothbrush, etc. As such, the user can differentiate between different virtual reality articles.

(2) Article Specification

The distracting virtual reality articles displayed by the virtual reality device can have different specifications from the candidate virtual reality articles. "Specification" can be understood from multiple aspects:

In one situation, "specification" can be understood as a size of an article, that is, a scale of displaying the same virtual reality article by the virtual reality device. Assume that a candidate virtual reality article is a cup of a small size. A distracting virtual reality article can be a cup of a larger size. For example, the cup used as the candidate virtual reality article can use an original display scale (namely, ×1), and the cup used as the distracting virtual reality article can use a ×5 or another display scale.

In another situation, "specification" can be understood as a model of an article. For example, a candidate virtual reality article is a glass cup, and a distracting virtual reality article is a plastic cup. As such, even if the two cups have the same volume, the user can still differentiate between the different virtual reality articles. For another example, a candidate virtual reality article is a glass cup with a volume of 500 ml, and a distracting virtual reality article is a glass cup with a volume of 3000 ml. As such, even if the two cups have the same design, the user can still differentiate between the different virtual reality articles.

Certainly, "specification" can further be understood from other aspects, and details are omitted here for simplicity and the present application sets no limitation thereto.

(3) Spatial Posture

The distracting virtual reality articles displayed by the virtual reality device can have different spatial postures from the candidate virtual reality articles. For example, a candidate virtual reality article can be a cup with its opening facing upward, and a distracting virtual reality article can be a cup with its opening facing downward. For another example, a candidate virtual reality article can be a fountain pen with its nip facing leftward, and a distracting virtual reality article can be a fountain pen with its nip facing forward, etc.

(4) Relative Position Relationship with Another Virtual Reality Article

A candidate virtual reality article can be differentiated from a distracting virtual reality article based on a relative position relationship between the articles. For example, a candidate virtual reality article can be a cup on a virtual reality desk in a virtual reality scene, and a distracting virtual reality article can be a cup on a virtual reality tea table in a virtual reality scene. For another example, a candidate virtual reality article can be a fountain pen in an upper left corner on a desktop of a virtual reality desk in a virtual reality scene, and a distracting virtual reality article can be a fountain pen in an upper right corner on a desktop of or in a drawer of a virtual reality desk in a virtual reality scene, etc.

Certainly, one distracting virtual reality article can be differentiated from a candidate virtual reality article in at least one predetermined dimension. For example, when a candidate virtual reality article is a pen and a distracting virtual reality article is a toothbrush, the two articles can be consistent with or different from each other in terms of article specification, spatial posture, and relative position relationship.

In addition, the virtual reality device can further display distracting virtual reality articles that meet other predetermined dimensions. The present application sets no limitation thereto. Besides, the virtual reality device can display distracting virtual reality articles that meet at least one of the previous predetermined dimensions. The present application sets no limitation thereto.

Step 406: The virtual reality device generates selection operation information.

In the present implementation, similar to step 206 in the implementation shown in FIG. 2, the selection operation information can include virtual reality articles selected by the current user; or similar to step 308 in the implementation shown in FIG. 3, the selection operation information can include both virtual reality articles selected by the user and a selection sequence of the multiple virtual reality articles. However, different from the implementation shown in FIG. 2 or FIG. 3, in the present implementation, displayed virtual reality articles include the distracting virtual reality articles, and therefore the selection operation information may include distracting virtual reality articles (for example, description information such as ID information) selected by the user or a selection sequence. However, it does not affect subsequent processing of the virtual reality device, and the virtual reality device can still compare the selection operation information with the standard selection operation information, to determine whether the two pieces of information match each other.

For example, assume that the candidate virtual reality articles displayed by the virtual reality device can be virtual reality articles A, B, and C, and the distracting virtual reality articles displayed by the virtual reality device can be virtual reality articles D and E. When a solution similar to the solution shown in step 206 is used, if the standard selection operation information is "the user selects virtual reality articles A, B, and C", it can be determined that the selection operation information matches the standard selection operation information only when the selection operation information is "the user selects virtual reality articles A, B, and C". Otherwise, for example, if the selection operation information is "the user selects virtual reality articles A, D, and C", it can be determined that the selection operation information does not match the standard selection operation information.

When a solution similar to the solution shown in step 308 is used, if the standard selection operation information is "A→B→C" and the selection operation information is "A→B→C", it can be determined that the identity authentication of the current user succeeds. If the selection operation information is "A→D→C", it can be determined that the identity authentication fails. Certainly, if it is allowed to use some data in the selection operation information to form consecutive-selection operation information for matching with the standard selection operation information, when the selection operation information is "D→A→B→C→E", it can still be determined that the identity authentication of the current user succeeds, because the selection operation information includes consecutive-selection operation information "A→B→C".

Step 408: When the selected virtual reality scene is the predefined standard scene and the selection operation information matches the standard selection operation information, it can be determined that identity authentication of the current user succeeds.

Step 410: When the selected virtual reality scene is not the predefined standard scene or the selection operation information does not match the standard selection operation information, it can be determined that authentication fails.

In the present implementation, the predefined standard scene can be a fixed scene. For example, the predefined standard scene can be "study room" every time it is verified whether the current user is a specific user. Or, the predefined standard scene can be a dynamic scene. For example, the dynamic scene can be related to an initiation process of the identity authentication procedure. For example, when the identity authentication procedure is initiated by a "login function", the predefined standard scene can be "study room", and when the identity authentication procedure is initiated by a "payment function", the predefined standard scene can be "living room", etc.

It is worthwhile to note that, the technical features in the implementation shown in FIG. 4 are also applicable to other implementations provided in FIG. 2, FIG. 3, or the present application. For example, in the implementation shown in FIG. 4, the technical methods that the virtual reality device displays both the candidate virtual reality articles and several distracting virtual reality articles is also applicable to other implementations provided in FIG. 2, FIG. 3 or the present application, to improve reliability of the identity authentication. Similarly, other technical features in the implementation shown in FIG. 4 can also be applied to other implementations, and details are omitted here for simplicity.

Implementation 4

Figure 5:
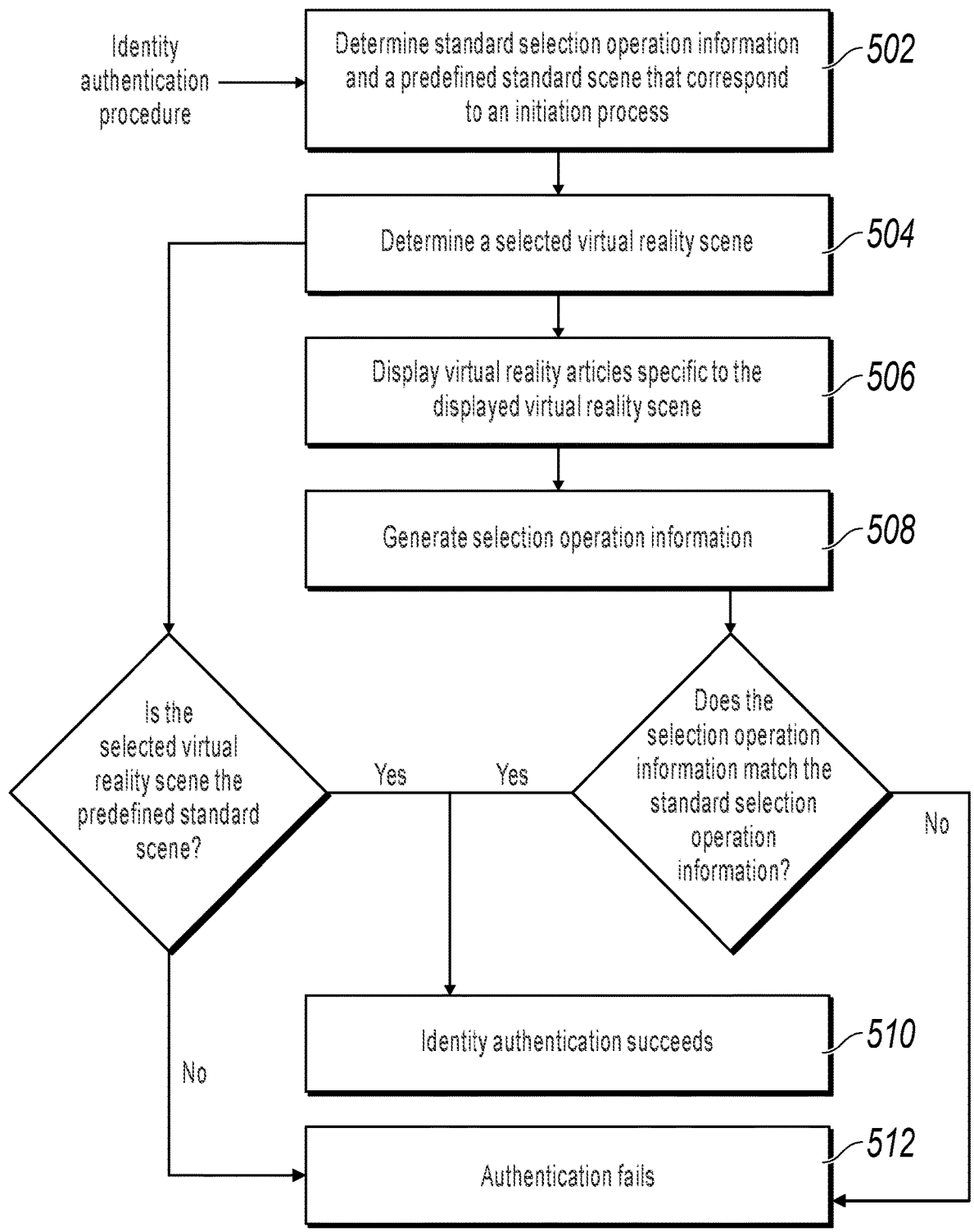
FIG. 5 is a flowchart illustrating an identity authentication method, according to Example Implementation 4 of the present application.

As yet another example implementation of the present application, the virtual reality device can provide multiple virtual reality scenes and each virtual reality scene corresponds to standard selection operation information. The user can complete the identity authentication only after selecting a predefined standard scene and generating selection operation information that matches standard selection operation information pre-associated with the standard scene. Correspondingly, FIG. 5 is a flowchart illustrating an identity authentication method, according to Example Implementation 3 of the present application. As shown in FIG. 5, the method is applied to a virtual reality device, and can include the following steps.

Step 502: When an identity authentication procedure is initiated, the virtual reality device determines a predefined standard scene corresponding to an initiation process and standard selection operation information corresponding to the standard scene.

In the present implementation, as described above, the predefined standard scene can be a dynamic scene. The dynamic scene can be related to the initiation process of the identity authentication procedure. For example, when the identity authentication procedure is initiated by a "login function", the predefined standard scene can be "study room", and when the identity authentication procedure is initiated by a "payment function", the predefined standard scene can be "living room", etc.

In the present implementation, similar to step 304 in the implementation shown in FIG. 3, there can be standard selection operation information pre-associated with each virtual reality scene. All virtual reality scenes are mutually independent, and corresponding standard selection operation information is mutually independent. However, only the standard selection operation information corresponding to the predefined standard scene can be used as a "correct answer" in the present implementation. In other words, a current user can complete identity authentication only when the user generates selection operation information meeting the "correct answer" in the correct virtual reality scene.

Step 504: The virtual reality device determines a virtual reality scene selected by a current user.

Step 506: The virtual reality device displays virtual reality articles for the displayed virtual reality scene.

In the present implementation, because there is standard selection operation information corresponding to each virtual reality scene, for the virtual reality scene selected by the current user, the virtual reality device generates corresponding virtual reality articles based on standard selection operation information pre-associated with the selected virtual reality scene. For example, the virtual reality articles can include only candidate virtual reality articles or can include both candidate virtual reality articles and distracting virtual reality articles.

It should be understood that, because there is standard selection operation information corresponding to each virtual reality scene, if the virtual reality scene selected by the current user is not the predefined standard scene, when the virtual reality device determines "candidate virtual reality articles" based on standard selection operation information pre-associated with the selected virtual reality scene, the "candidate virtual reality articles" actually are not necessarily indicated by the standard selection operation information pre-associated with the predefined standard scene. In practice, it is possible that the "candidate virtual reality articles" displayed by the virtual reality device are totally irrelevant to the standard selection operation information pre-associated with the predefined standard scene, and as a result, the current user cannot generate selection operation information that meets the "correct answer".

In addition, each virtual reality scene uses mutually independent standard selection operation information. Therefore, predefined standard scenes in different situations can use corresponding "correct answers", to increase a quantity and complexity of the "correct answers", thereby helping improve information security and authentication reliability.

Step 508: The virtual reality device generates selection operation information.

In the present implementation, reference can be made to step 406 in the implementation shown in FIG. 4, and details are omitted here for simplicity.

Step 510: When the selected virtual reality scene is the predefined standard scene and the selection operation information matches the standard selection operation information, it can be determined that identity authentication of the current user succeeds.

Step 512: When the selected virtual reality scene is not the predefined standard scene or the selection operation information does not match the standard selection operation information, it can be determined that authentication fails.

In addition, in the authentication phase, a quantity of authentication times of the user can be pre-determined so that when a quantity of consecutive authentication failures of the current user reaches the quantity of authentication times, a further authentication operation of the current user can be limited, and a notification message can be sent based on a contact reserved by the specific user, to notify the user of a security risk.

In conclusion, a virtual reality scene selected by a user, selection operation information generated by the user, etc. are identified so that the user can implement identity authentication efficiently and conveniently in a virtual reality scene.

Figure 6:
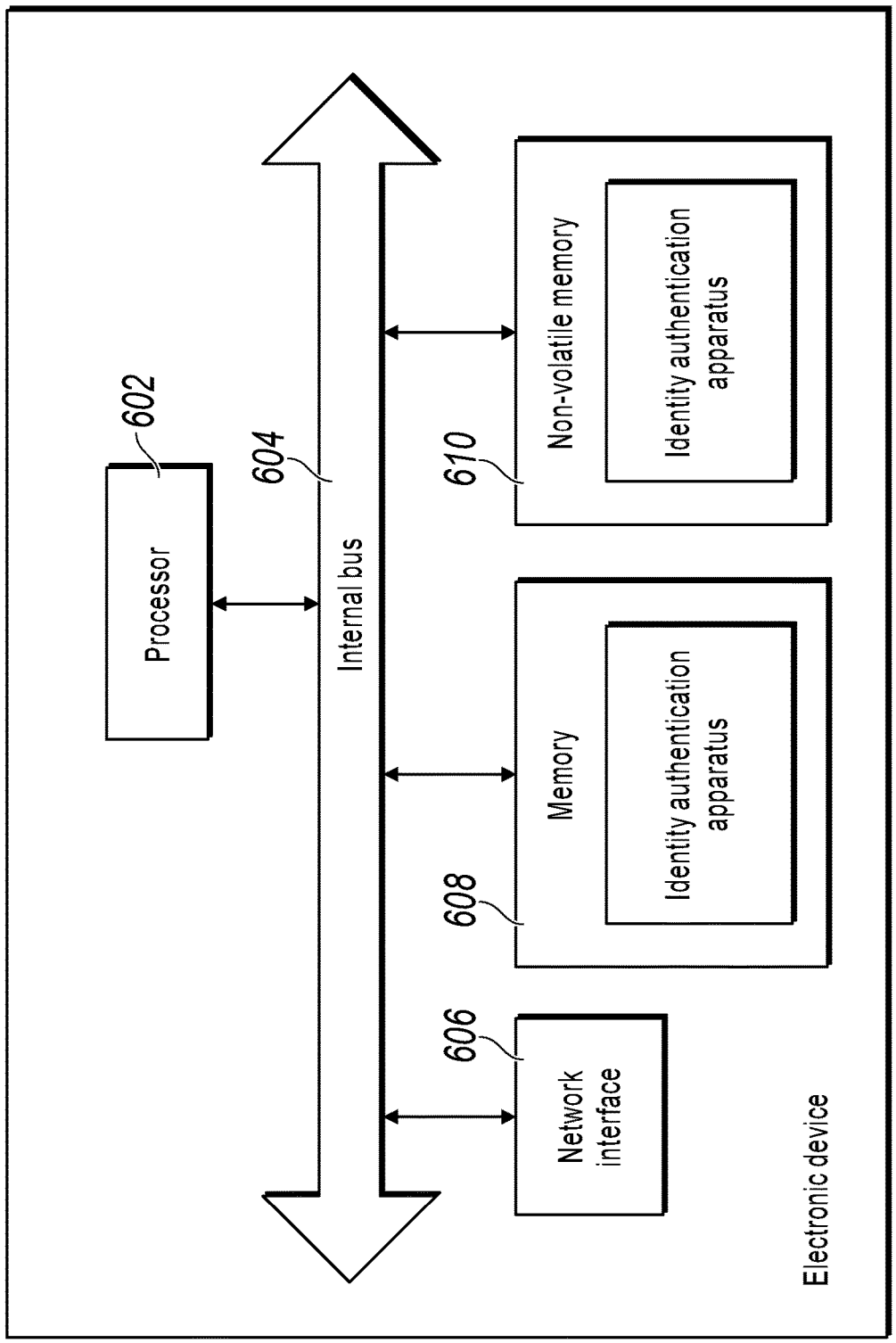
FIG. 6 is a schematic structural diagram illustrating an electronic device, according to an example implementation of the present application.

FIG. 6 is a schematic structural diagram illustrating an electronic device, according to an example implementation of the present application. As shown in FIG. 6, in terms of hardware, the electronic device includes a processor 602, an internal bus 604, a network interface 606, a memory 608, and a non-volatile memory 610, and certainly can further include hardware needed by other services. The processor 602 reads a corresponding computer program from the non-volatile memory 610 to the memory 608 for running, and an identity authentication apparatus is logically formed. Certainly, in addition to a software implementation, the present application does not exclude another implementation, for example, a logic device or a combination of hardware and software. That is, an execution body of the following processing procedure is not limited to each logical unit, and can also be hardware or a logic device. For example, the previous electronic device can be a virtual reality device.

Figure 7:
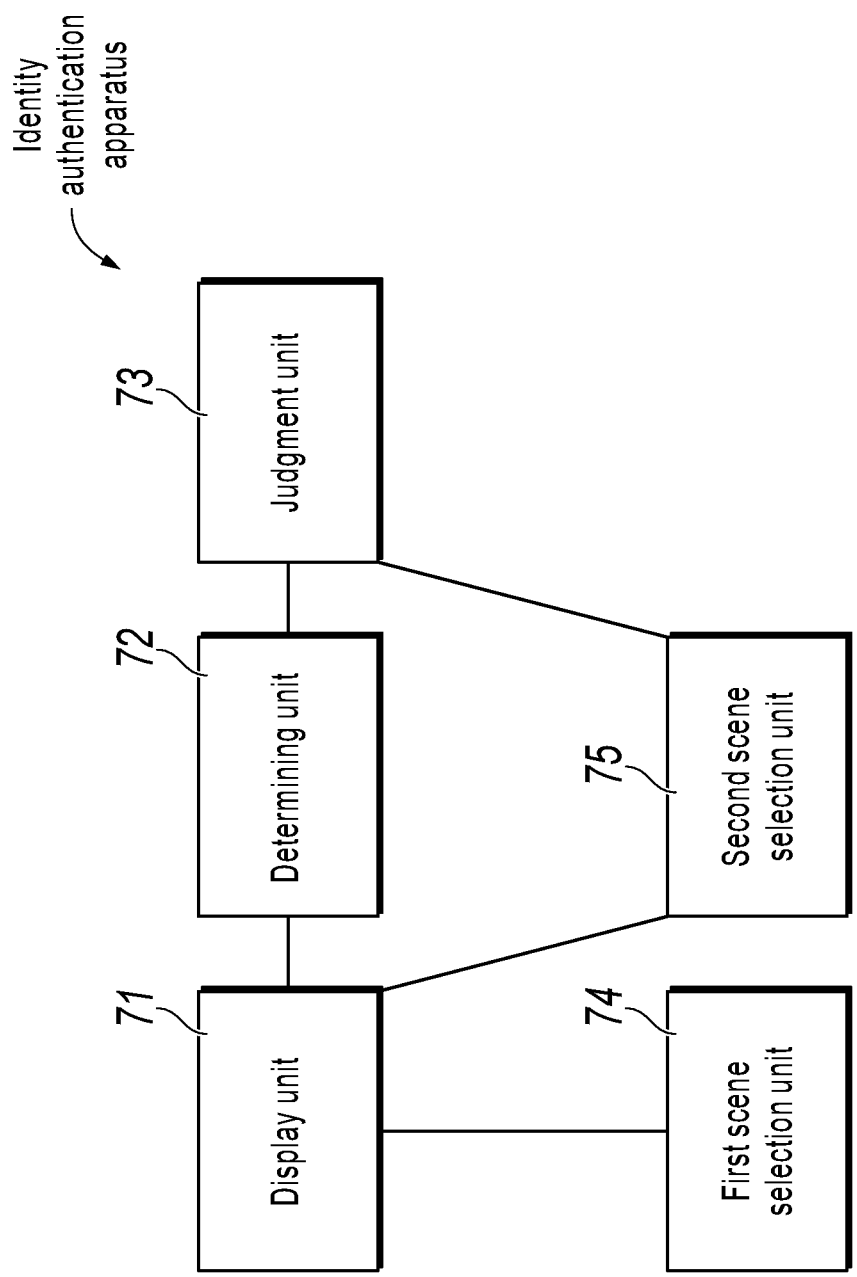
FIG. 7 is a block diagram illustrating an identity authentication apparatus, according to an example implementation of the present application.

As shown in FIG. 7, in a software implementation, the identity authentication apparatus can include a display unit 71, a determining unit 72, and a judgment unit 73, where the display unit 71 is configured to display multiple virtual reality articles when an identity authentication procedure specific to a user is initiated; the determining unit 72 is configured to determine selection operation information of the user for the virtual reality articles; and the judgment unit 73 is configured to determine that identity authentication of the user succeeds when the selection operation information matches predefined standard selection operation information.

Optionally, the display unit 71 is configured to: display candidate virtual reality articles indicated by the standard selection operation information; or display both candidate virtual reality articles indicated by the standard selection operation information and distracting virtual reality articles not indicated by the standard selection operation information.

Optionally, the distracting virtual reality articles are different from the candidate virtual reality articles in a predetermined dimension, where the predetermined dimension includes at least one of the following: an article category, an article specification, a spatial posture, and a relative position relationship with another virtual reality article.

Optionally, the determining unit 72 is configured to determine virtual reality articles selected by the user, and add the virtual reality articles as the selection operation information; and the judgment unit 73 is configured to, when the virtual reality articles selected by the user are consistent with candidate virtual reality articles indicated by the standard selection operation information, determine that the selection operation information matches the standard selection operation information and determine that the identity authentication of the user succeeds.

Optionally, the determining unit 72 is configured to determine a selection sequence of the user for the virtual reality articles, and add the selection sequence as the selection operation information; and the judgment unit 73 is configured to, when the virtual reality articles selected by the user are consistent with the candidate virtual reality articles indicated by the standard selection operation information and the selection sequence is consistent with a standard sequence of the candidate virtual reality articles indicated by the standard selection operation information, determine that the selection operation information matches the standard selection operation information and determine that the identity authentication of the user succeeds.

Optionally, the judgment unit 73 is configured to: when the selection operation information is the same as the standard selection operation information, determine that the selection operation information matches the standard selection operation information and determine that the identity authentication of the user succeeds; or when the selection operation information includes consecutive-selection operation information of the user for several virtual reality articles and the consecutive-selection operation information is the same as the standard selection operation information, determine that the selection operation information matches the standard selection operation information and determine that the identity authentication of the user succeeds.

Optionally, the apparatus further includes a first scene selection unit 74, configured to provide the user with scene options corresponding to multiple predefined virtual reality scenes, and determine a scene option selected by the user; and the display unit 71 is configured to, in a virtual reality scene corresponding to the scene option selected by the user, display virtual reality articles pre-associated with the displayed virtual reality scene; and the judgment unit 73 is configured to, when the selection operation information matches standard selection operation information pre-associated with the displayed virtual reality scene, determine that the identity authentication of the user succeeds.

Optionally, the apparatus further includes a second scene selection unit 75, configured to provide the user with scene options corresponding to multiple predefined virtual reality scenes, and determine a scene option selected by the user; and the display unit 71 is configured to display the virtual reality articles in a virtual reality scene corresponding to the scene option selected by the user; and the judgment unit 73 is configured to, when the displayed virtual reality scene is a predefined standard scene and the selection operation information matches the predefined standard selection operation information, determine that the identity authentication of the user succeeds.

Optionally, the display unit 71 is configured to: display same virtual reality articles in each virtual reality scene selected by the user.

Optionally, the display unit 71 is configured to: in each virtual reality scene selected by the user, separately display virtual reality articles pre-associated with the displayed virtual reality scene.

Optionally, the predefined standard scene is related to an initiation process of the identity authentication procedure.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), one or more input/output interfaces, one or more network interfaces, and one or more memories.

The memory may include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in the present specification, the computer readable medium does not include transitory computer-readable media (transitory media), for example, a modulated data signal and carrier.

It is worthwhile to note that, the term "include", "comprise", or their any other variant is intended to cover a non-exclusive inclusion so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

Example implementations are described in detail here, and an example of the implementations is indicated in the accompanying drawings. When the descriptions relate to the accompanying drawings, the same number in different accompanying drawings indicates the same or similar element unless another indication is stated. Implementation methods described in the example implementations do not represent all implementation methods consistent with the present application. Instead, these implementation methods are merely examples of apparatus and methods consistent with some aspects described in detail in the claims of the present application.

The terms used in the present application are merely for illustrating specific implementations, and are not intended to limit the present application. The terms "a", "said" and "the" of singular forms used in the present application and the appended claims of the present application are also intended to include plural forms, unless otherwise specified in the context clearly. It should also be understood that, the term "and/or" used here indicates and includes any or all possible combinations of one or more associated listed items.

It should be understood that although terms "first", "second", "third", etc. may be used in the present application to describe various types of information, the information is not limited to the terms. These terms are only used to differentiate information of a same type. For example, without departing from the scope of the present application, first information may also be referred to as second information, and similarly, the second information may be referred to as the first information. Depending on the context, the word "if" as used here can be interpreted as " . . . when" or "when . . . " or "in response to determining".

The previous descriptions are merely example implementations of the present application, but are not intended to limit the present application. Any modification, equivalent replacement, or improvement made without departing from the spirit and principle of the present application should fall within the protection scope of the present application.

What is claimed is:

1. A computer-implemented method, comprising:
    initiating, by a virtual reality device, an identity authentication procedure of a user, wherein the identity authentication procedure of the user is for at least one of account login, information inquiry, information modification, or online payment;
    providing, by the virtual reality device through a virtual reality user interface, the user with a plurality of scene options;
    receiving, by the virtual reality device through the virtual reality user interface, a first user selection of a scene option from the plurality of scene options;
    after receiving the first user selection of the scene option, displaying, by the virtual reality device through the virtual reality user interface, a plurality of virtual reality articles in a virtual reality scene corresponding to the scene option selected by the user;
    receiving, by the virtual reality device through the virtual reality user interface, a second user selection of a plurality of candidate virtual reality articles from the displayed plurality of virtual reality articles in a particular selection sequence, wherein a particular candidate virtual reality article is selected multiple times in the particular selection sequence;
    generating, by the virtual reality device, selection operation information of the user for the displayed plurality of virtual reality articles based on the received second user selection of the plurality of candidate virtual reality articles in the particular selection sequence;
    determining, by the virtual reality device, whether the scene option selected by the user is a predefined standard scene associated with the identity authentication procedure and the selection operation information matches predefined standard selection operation information, wherein determining whether the scene option selected by the user is the predefined standard scene associated with the identity authentication procedure includes comparing the scene option selected by the user with a plurality of predefined standard scenes, wherein the plurality of predefined standard scenes include at least two of a predefined standard scene associated with the account login, a predefined standard scene associated with the information inquiry, a predefined standard scene associated with the information modification, or a predefined standard scene associated with the online payment, and wherein determining whether the selection operation information matches the predefined standard selection operation information includes comparing the particular selection sequence with a predefined selection sequence in the predefined standard selection operation information;
    in response to determining that the scene option selected by the user is the predefined standard scene associated with the identity authentication procedure and the selection operation information matches the predefined standard selection operation information, determining, by the virtual reality device, that the identity authentication procedure of the user succeeds; and
    in response to determining that the identity authentication procedure of the user succeeds, allowing, by the virtual reality device, the user to perform at least one of the account login, the information inquiry, the information modification, or the online payment.

2. The computer-implemented method of claim 1, wherein the plurality of virtual reality articles are at least one of:
    a plurality of candidate virtual reality articles indicated by the predefined standard selection operation information; or
    the plurality of candidate virtual reality articles indicated by the predefined standard selection operation information and one or more distracting virtual reality articles not indicated by the predefined standard selection operation information.

3. The computer-implemented method of claim 2, wherein the one or more distracting virtual reality articles are different from the plurality of candidate virtual reality articles in a predetermined dimension, and wherein the predetermined dimension comprises at least one of an article category, an article specification, a spatial posture, or a relative position relationship with another virtual reality article.

4. The computer-implemented method of claim 1, wherein generating the selection operation information of the user for the plurality of virtual reality articles comprises:
    determining one or more virtual reality articles selected by the user; and
    adding the one or more virtual reality articles to the selection operation information.

5. The computer-implemented method of claim 4, wherein determining that the identity authentication procedure of the user succeeds comprises:
    in response to determining that the one or more virtual reality articles selected by the user are consistent with one or more candidate virtual reality articles indicated by the predefined standard selection operation information:
        determining that the selection operation information matches the predefined standard selection operation information; and
        determining that the identity authentication procedure of the user succeeds.

6. The computer-implemented method of claim 5, wherein generating the selection operation information of the user for the plurality of virtual reality articles further comprises:
  determining a selection sequence of the user for the one or more virtual reality articles; and
  adding the selection sequence to the selection operation information.

7. The computer-implemented method of claim 6, wherein determining that the identity authentication procedure of the user succeeds comprises:
  in response to determining that the one or more virtual reality articles selected by the user are consistent with the one or more candidate virtual reality articles indicated by the predefined standard selection operation information and the selection sequence is consistent with a predefined standard sequence of the one or more candidate virtual reality articles indicated by the predefined standard selection operation information:
    determining that the selection operation information matches the predefined standard selection operation information; and
    determining that the identity authentication procedure of the user succeeds.

8. The computer-implemented method of claim 1, wherein the plurality of scene options correspond to a plurality of predefined virtual reality scenes, wherein each predefined virtual reality scene is associated with an initiation process of the identity authentication procedure of the user, and wherein the method further comprises:
  determining a scene option selected by the user.

9. The computer-implemented method of claim 8, wherein:
  displaying the plurality of virtual reality articles comprises in a virtual reality scene corresponding to the scene option selected by the user, only displaying a plurality of virtual reality articles pre-associated with the virtual reality scene; and
  determining that the selection operation information matches predefined standard selection operation information comprises determining that the selection operation information matches predefined standard selection operation information pre-associated with the virtual reality scene.

10. The computer-implemented method of claim 8, wherein a same plurality of virtual reality articles are displayed in each virtual reality scene selected by the user.

11. A non-transitory, computer-readable medium storing one or more instructions executable by a computer system to perform operations comprising:
  initiating an identity authentication procedure of a user, wherein the identity authentication procedure of the user is for at least one of account login, information inquiry, information modification, or online payment;
  providing, through a virtual reality user interface, the user with a plurality of scene options;
  receiving, through the virtual reality user interface, a first user selection of a scene option from the plurality of scene options;
  after receiving the first user selection of the scene option, displaying, through the virtual reality user interface, a plurality of virtual reality articles in a virtual reality scene corresponding to the scene option selected by the user;
  receiving, through the virtual reality user interface, a second user selection of a plurality of candidate virtual reality articles from the displayed plurality of virtual reality articles in a particular selection sequence, wherein a particular candidate virtual reality article is selected multiple times in the particular selection sequence;
  generating selection operation information of the user for the displayed plurality of virtual reality articles based on the received second user selection of the plurality of candidate virtual reality articles in the particular selection sequence;
  determining whether the scene option selected by the user is a predefined standard scene associated with the identity authentication procedure and the selection operation information matches predefined standard selection operation information, wherein determining whether the scene option selected by the user is the predefined standard scene associated with the identity authentication procedure includes comparing the scene option selected by the user with a plurality of predefined standard scenes, wherein the plurality of predefined standard scenes include at least two of a predefined standard scene associated with the account login, a predefined standard scene associated with the information inquiry, a predefined standard scene associated with the information modification, or a predefined standard scene associated with the online payment, and wherein determining whether the selection operation information matches the predefined standard selection operation information includes comparing the particular selection sequence with a predefined selection sequence in the predefined standard selection operation information;
  in response to determining that the scene option selected by the user is the predefined standard scene associated with the identity authentication procedure and the selection operation information matches the predefined standard selection operation information, determining that the identity authentication procedure of the user succeeds; and
  in response to determining that the identity authentication procedure of the user succeeds, allowing the user to perform at least one of the account login, the information inquiry, the information modification, or the online payment.

12. The non-transitory, computer-readable medium of claim 11, wherein the plurality of virtual reality articles are at least one of:
  a plurality of candidate virtual reality articles indicated by the predefined standard selection operation information; or
  the plurality of candidate virtual reality articles indicated by the predefined standard selection operation information and one or more distracting virtual reality articles not indicated by the predefined standard selection operation information.

13. The non-transitory, computer-readable medium of claim 12, wherein the one or more distracting virtual reality articles are different from the plurality of candidate virtual reality articles in a predetermined dimension, and wherein the predetermined dimension comprises at least one of an article category, an article specification, a spatial posture, or a relative position relationship with another virtual reality article.

14. The non-transitory, computer-readable medium of claim 11, wherein generating the selection operation information of the user for the plurality of virtual reality articles comprises:

determining one or more virtual reality articles selected by the user; and adding the one or more virtual reality articles to the selection operation information.

15. The non-transitory, computer-readable medium of claim 14, wherein determining that the identity authentication procedure of the user succeeds comprises:

in response to determining that the one or more virtual reality articles selected by the user are consistent with one or more candidate virtual reality articles indicated by the predefined standard selection operation information:

determining that the selection operation information matches the predefined standard selection operation information; and determining that the identity authentication procedure of the user succeeds.

16. The non-transitory, computer-readable medium of claim 15, wherein generating the selection operation information of the user for the plurality of virtual reality articles further comprises:

determining a selection sequence of the user for the one or more virtual reality articles; and adding the selection sequence to the selection operation information.

17. The non-transitory, computer-readable medium of claim 16, wherein determining that the identity authentication procedure of the user succeeds comprises:

in response to determining that the one or more virtual reality articles selected by the user are consistent with the one or more candidate virtual reality articles indicated by the predefined standard selection operation information and the selection sequence is consistent with a predefined standard sequence of the one or more candidate virtual reality articles indicated by the predefined standard selection operation information:

determining that the selection operation information matches the predefined standard selection operation information; and determining that the identity authentication procedure of the user succeeds.

18. The non-transitory, computer-readable medium of claim 11, wherein the plurality of scene options correspond to a plurality of predefined virtual reality scenes, wherein each predefined virtual reality scene is associated with an initiation process of the identity authentication procedure of the user, and wherein the operations further comprise:

determining a scene option selected by the user.

19. The non-transitory, computer-readable medium of claim 18, wherein:

displaying the plurality of virtual reality articles comprises in a virtual reality scene corresponding to the scene option selected by the user, only displaying a plurality of virtual reality articles pre-associated with the virtual reality scene; and determining that the selection operation information matches predefined standard selection operation information comprises determining that the selection operation information matches predefined standard selection operation information pre-associated with the virtual reality scene.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

initiating an identity authentication procedure of a user, wherein the identity authentication procedure of the user is for at least one of account login, information inquiry, information modification, or online payment;

providing, through a virtual reality user interface, the user with a plurality of scene options;

receiving, through the virtual reality user interface, a first user selection of a scene option from the plurality of scene options;

after receiving the first user selection of the scene option, displaying, through the virtual reality user interface, a plurality of virtual reality articles in a virtual reality scene corresponding to the scene option selected by the user;

receiving, through the virtual reality user interface, a second user selection of a plurality of candidate virtual reality articles from the displayed plurality of virtual reality articles in a particular selection sequence, wherein a particular candidate virtual reality article is selected multiple times in the particular selection sequence;

generating selection operation information of the user for the displayed plurality of virtual reality articles based on the received second user selection of the plurality of candidate virtual reality articles in the particular selection sequence;

determining whether the scene option selected by the user is a predefined standard scene associated with the identity authentication procedure and the selection operation information matches predefined standard selection operation information, wherein determining whether the scene option selected by the user is the predefined standard scene associated with the identity authentication procedure includes comparing the scene option selected by the user with a plurality of predefined standard scenes, wherein the plurality of predefined standard scenes include at least two of a predefined standard scene associated with the account login, a predefined standard scene associated with the information inquiry, a predefined standard scene associated with the information modification, or a predefined standard scene associated with the online payment, and wherein determining whether the selection operation information matches the predefined standard selection operation information includes comparing the particular selection sequence with a predefined selection sequence in the predefined standard selection operation information;

in response to determining that the scene option selected by the user is the predefined standard scene associated with the identity authentication procedure and the selection operation information matches the predefined standard selection operation information, determining that the identity authentication procedure of the user succeeds; and in response to determining that the identity authentication procedure of the user succeeds, allowing the user to perform at least one of the account login, the information inquiry, the information modification, or the online payment.

* * * * *